(12) United States Patent
Laake

(10) Patent No.: US 8,615,362 B2
(45) Date of Patent: Dec. 24, 2013

(54) NEAR-SURFACE GEOMORPHOLOGICAL CHARACTERIZATION BASED ON REMOTE SENSING DATA

(75) Inventor: Andreas Laake, Kingston (GB)

(73) Assignee: WesternGeco L.L.C., Houston, TX (US)

(*) Notice: Subject to any disclaimer, the term of this patent is extended or adjusted under 35 U.S.C. 154(b) by 876 days.

(21) Appl. No.: 12/568,322

(22) Filed: Sep. 28, 2009

(65) Prior Publication Data
US 2010/0091611 A1    Apr. 15, 2010

Related U.S. Application Data

(60) Provisional application No. 61/104,977, filed on Oct. 13, 2008, provisional application No. 61/104,980, filed on Oct. 13, 2008, provisional application No. 61/104,582, filed on Oct. 10, 2008.

(51) Int. Cl.
| | | |
|---|---|---|
| G06T 17/05 | (2011.01) | |
| G01V 8/00 | (2006.01) | |
| G01S 13/86 | (2006.01) | |
| G01S 13/89 | (2006.01) | |
| G01S 17/89 | (2006.01) | |

(52) U.S. Cl.
CPC ............. *G06T 17/05* (2013.01); *G01S 13/865* (2013.01); *G01S 13/89* (2013.01); *G01S 17/89* (2013.01); *G01V 8/00* (2013.01)
USPC .......................................................... 702/5

(58) Field of Classification Search
CPC ........ G06T 17/05; G01S 13/865; G01S 13/89
USPC .............................................................. 702/5
See application file for complete search history.

(56) References Cited

U.S. PATENT DOCUMENTS

| | | | | |
|---|---|---|---|---|
| 4,698,759 | A | * | 10/1987 | Eliason et al. ................... 702/5 |
| 5,053,778 | A |   | 10/1991 | Imhoff |
| 5,321,613 | A |   | 6/1994 | Porter et al. |
| 5,671,136 | A |   | 9/1997 | Willhoit, Jr. |
| 5,781,503 | A |   | 7/1998 | Kim |
| 5,905,657 | A |   | 5/1999 | Celniker |
| 5,987,388 | A | * | 11/1999 | Crawford et al. .............. 702/16 |
| 6,016,461 | A | * | 1/2000 | Thore ............................. 702/6 |
| 6,028,819 | A | * | 2/2000 | Mullarkey et al. ............. 367/37 |
| 6,035,255 | A |   | 3/2000 | Murphy et al. |

(Continued)

FOREIGN PATENT DOCUMENTS

| | | |
|---|---|---|
| CN | 1387051 | 12/2002 |
| WO | 2005119298 A3 | 12/2005 |

OTHER PUBLICATIONS

Laake et al., The Role of Remote Sensing Data in Near-Surface Seismic Characterization, First Break, 2007, pp. 51-55, vol. 25.

(Continued)

*Primary Examiner* — Mark Hellner
*Assistant Examiner* — Ari M Diacou

(57) ABSTRACT

A technique includes receiving first data belonging to a first type of remote sensing data for a region of interest and receiving second data belonging to a different second type of remote sensing data for the region of interest. The technique includes determining at least one geomorphological feature of the region of interest based at least in part on the first and second data.

47 Claims, 16 Drawing Sheets

(56) References Cited

U.S. PATENT DOCUMENTS

| | | | |
|---|---|---|---|
| 6,597,992 B2* | 7/2003 | Rooney et al. | 702/5 |
| 6,665,617 B2 | 12/2003 | Shobayashi | |
| 6,686,917 B2* | 2/2004 | Tarr | 345/441 |
| 6,885,947 B2 | 4/2005 | Xiao et al. | |
| 7,031,838 B1* | 4/2006 | Young et al. | 702/2 |
| 7,218,573 B1 | 5/2007 | Laake | |
| 7,330,799 B2 | 2/2008 | Lefebvre et al. | |
| 7,408,836 B2 | 8/2008 | Muyzert et al. | |
| 7,483,917 B2* | 1/2009 | Sullivan et al. | 1/1 |
| 2003/0083819 A1* | 5/2003 | Rooney et al. | 702/5 |
| 2003/0198404 A1* | 10/2003 | Frisken et al. | 382/285 |
| 2005/0086227 A1* | 4/2005 | Sullivan et al. | 707/7 |
| 2005/0114031 A1 | 5/2005 | Thambynayagam et al. | |
| 2005/0157589 A1* | 7/2005 | Laake | 367/68 |
| 2005/0171700 A1 | 8/2005 | Dean | |
| 2006/0036367 A1 | 2/2006 | Brewster | |
| 2006/0136162 A1 | 6/2006 | Hamman et al. | |
| 2007/0195645 A1 | 8/2007 | Laake | |
| 2008/0040349 A1 | 2/2008 | Rahmes et al. | |
| 2008/0195321 A1* | 8/2008 | Levin | 702/16 |
| 2008/0294393 A1 | 11/2008 | Laake et al. | |
| 2009/0122645 A1 | 5/2009 | Guigne et al. | |
| 2009/0161488 A1 | 6/2009 | Ferber et al. | |
| 2010/0091611 A1 | 4/2010 | Laake | |
| 2010/0119118 A1* | 5/2010 | Laake | 382/109 |
| 2010/0128563 A1 | 5/2010 | Strobbia et al. | |
| 2011/0085418 A1 | 4/2011 | Laake | |
| 2011/0120724 A1 | 5/2011 | Krohn | |

OTHER PUBLICATIONS

Laake, et al., Integrated Approach to 3D Near-Surface Characterization, 70th EAGE Conference and Exhibition Incorporating SPE, Jun. 2008, Paper D033.

Marsden, Static Corrections—a review, Part 1, The Leading Edge, 1993, pp. 43-49, vol. 12.

Marsden, Static Corrections—a review, Part 2, The Leading Edge, 1993, pp. 115-120, vol. 12.

Marsden, Static Corrections—a review, Part 3, The Leading Edge, 1992, pp. 210-216, vol. 12.

Palmer, An Introduction to the Generalized Reciprocal Method of Seismic Refraction Interpretation, Geophysics, 1981, pp. 1508-1518,vol. 46 No. 11.

Rotham, Automatic Estimation of Large Residual Statics Corrections, Geophysics, 1986, pp. 332-334, vol. 51 No. 2.

Taner, et al., Estimation and Correction of Near-Surface Time Anomalies, Geophysics, 1974, pp. 441-463, vol. 39 No. 4.

Taner, et al., The Dynamics of Statics, The Leading Edge, 2007, pp. 396-402.

Zhu, et al., Tomostatics: Turning-Ray Tomography and Static Corrections, The Leading Edge, 1992, pp. 15-23.

Cutts, et al., Vibrator Data Quality Prediction from Remote Sensing-Based Near-Surface Analysis, 70th EAGE Conference and Exhibition Incorporating SPE, Rome 2008, Jun. 9-12, 2008, Paper B005.

Insley, et al., Seismic Quality Analysis in Algeria: Application of Earth Observation data sets to Oil & Gas Exploration, PESGB London Evening Meeting, 2003.

Insley, et al., Satellite based Seismic Technology, Case Study: Berkine Basin, Algeria, 66th EAGE Conference and Exhibition, 2004.

Laake, Application of Landsat Data to Seismic Exploration—Case Study from Kuwait. Kuwait First International Remote Sensing Conference and Exhibition, Sep. 2005.

Laake, et al., Vibroseis Data Quality Estimation from Remote Sensing Data, EAGE 67th Conference and exhibition, Jun. 2005.

Laake, et al., Integration of Remote Sensing Data with Geology and Geophysics—Case study from Bahrain, GEO 2006.

Laake, et al., Satellite-Based Seismic Technology Case Study: Berkine Basin, Algeria, EAGE 66th Conference and Exhibition, Jun. 2004.

Laake, et al., Applications of Satellite Imagery to Seismic Survey Design. The Leading Edge, 2004, pp. 1062-1064, vol. 23.

PCT Search Report, dated May 14, 2010, Application No. PCT/US2009/059250.

Marsden, "Static corrections—a review," Part I, The Leading Edge, Jan. 1993, pp. 43-49.

Marsden, "Static corrections—a review," Part II, The Leading Edge, Feb. 1993, pp. 115-120.

Marsden, "Static corrections—a review," Part III, The Leading Edge, Mar. 1993, pp. 210-216.

Palmer, "An Introduction to the Generalized Reciprocal Method of Seismic Refraction Interpretation," Geophysics, vol. 46, No. 11, Nov. 1981, pp. 1508-1518.

Taner et al., "Estimation and Correction of Near-Surface Time Anomalies," Geophysics, vol. 39 No. 4, Aug. 1974, pp. 441-463.

Taner et al., "The Dynamics of Statics," The Leading Edge, Apr. 2007, pp. 396-402.

Zhu et al., "Tomostatics: Turning-ray tomography+ static corrections," Geophysics, Dec. 1992, pp. 15-23.

Short, Sr., N. M., and Blair, JR., R. W., (eds.) Geomorphology from Space, NASA, 1986, URL: http://geoinfo.amu.edu.pl/wpk/geos/GEO_COMPLETE_TOC.html.

Harris, R., Cooper, M., and Shook, I., "Focusing Oil and Gas Exploration in Eastern Yemen by Using Satellite Images and Elevation Data Alongside Conventional 2D Seismic," CSEG Recorder, Feb. 2003: pp. 31-34.

Pfleiderer et al., "Visualization of Vienna's Subsurface," SPE 65132, Offshore Europe Proceedings, Feb. 2004: pp. 1-6.

Bubeqi, L., Kaculini, S., Bendjaballah, M., Bambrick, J., "Improving Structural Interpretation Using Modern Techniques for Solving Complex Problems: From Near Surface Anomalies to Pre Stack Depth Migration_Block 32 Yemen," 2005 CSEG National Convention: pp. 57-60.

International Search Report and Written Opinion of PCT Appl. No. PCT/US2008/064357 dated Sep. 2, 2008: pp. 1-13.

Laake, A., Strobbia, C., and Cutts, A., "Integrated Approach to 3D Near Surface Characterization in Desert Regions," first break, Nov. 2008, vol. 26: pp. 109-112.

Ferber, R., Velasco, L., West, L., "Paper V001: Interferometric Rayparameter Estimation and Applications," 71st EAGE Conference & Exhibition, Jun., 2009: pp. 1-5.

Laake, A., Zaghloul, A., Strobbia, C., "Geomorphology —Understanding the Near-Surface Impact on Seismic Data," 71st EAGE Conference and Exhibition, EAGE Workshop 10, Jun. 2009: pp. 1-7.

International Search Report and Written Opinion of PCT Application No. PCT/US2010/051969 dated May 30, 2011.

Marion et al., "SPE 65132: Constraining 3D static models to seismic and sedimentological data: a further step towards reduction of uncertainties," SPE International, 2000: pp. 1-6.

International Search Report and Written Opinion of PCT Appl. No. PCT/US2009/065347 dated Jul. 1, 2010: pp. 1-11.

Office Action of Chinese Application No. 200920147176.7 dated Sep. 20, 2012: pp. 1-6.

Al-Juaidi et al., "Merged remotely sensed data for geomorphological investigations in deserts: examples from central Saudi Arabia," The Geographical Journal, Jun. 2003, vol. 169(2): pp. 117-130.

Barmin et al., "A Fast and Reliable Method for Surface Wave Tomography," Pure appl. geophys., 2001, vol. 158: pp. 1351-1375.

Bennett, "3-D seismic refraction for deep exploration targets," The Leading Edge, Feb. 1999: pp. 186-191.

Bensen et al., "Processing seismic ambient noise data to obtain reliable broad-band surface wave dispersion measurements," Geophys. J. Inst., 2007, vol. 169: pp. 1239-1260.

Bohlen et al., "1.5D inversion of lateral variation of Scholte-wave dispersion," Geophysics, Mar.-Apr. 2004, vol. 69 (2): pp. 330-344.

Grandjean et al., "2M-SASW: Multifold multichannel seismic inversion of local dispersion of Rayleigh waves in laterally heterogeneous subsurfaces: application to the Super-Sauze earthflow, France," Near Surface Geophysics, 2006, vol. 4: pp. 367-375.

Hayashi et al., "CMP analysis of multi-channel and multi-shot surface-wave data," SEG Int'l Exposition and 72nd Annual Meeting, Oct. 2002: pp. 1-4.

(56) References Cited

OTHER PUBLICATIONS

Laake, "Integration of Satellite Imagery, Geology and Geophysical Data," Earth and Environmental Sciences, 2011: pp. 467-492.

Lijuan et al., "A New Technology of Optimizing Survey Design on Real-Surface Model," SEG Las Vegas Annual Meeting, 2008: pp. 158-162.

McMechan et al., "Analysis of dispersive waves by wave field transformation," Geophysics, Jun. 1981, vol. 46(6): pp. 869-874.

Morgan, "Developing a Seismic Viewer Extension for ArcMap," MSc Exploration Geophysics, University of London, ESRI Petroleum User Group Conference, 2005: pp. 1-20.

Ross et al., "Characterization of spatially varying surface waves in a land seismic survey," SEG Las Vegas Annual Meeting, 2008: pp. 2556-2560.

Schmidt, "Multiple Emitter Location and Signal Parameter Estimation," IEEE Transactions on Antennas and Propagation, Mar. 1986, vol. AP-34(3); pp. 276-280.

Shaohua et al., "Applying 3D seismic in a complex mountainous area of Tarim Basin," The Leading Edge, Sep. 2002: pp. 902-905.

Shapiro et al., "High-Resolution Surface-Wave Tomography from Ambient Seismic Noise," Science, Mar. 2005, vol. 307: pp. 1615-1618.

Short et al. (Baker, Hayden, Hayden et al.), "Chapter 1: Introduction: Regional Landforms Analysis; Chapter 11: Geomorphological Mapping; Chapter 12: Global Geomorphology: Outlook for the Future," Geomorphology from Space a global Overview of Regional Landforms, 1986: pp. 1-73, <http:11geoinfo.amu—edu.pl/wkp/geos/ GEO_COMPLETE_TOC.html>.

Socco et al., "Surface-wave method for near-surface characterization: a tutorial," Near Surface Geophysics, 2004: pp. 165-185.

Strobbia et al., "Multi-offset phase analysis of surface wave data (MOPA)," Journal of Applied Geophysics, 2006, vol. 59: pp. 300-313.

Strobbia et al., "Surface waves: processing, inversion and removal," first break, Aug. 2010, vol. 39: pp. 85-91.

Xia et al., "Estimation of near-surface quality factors by inversion of Rayleigh-wave attenuations coefficients," SEG Denver Annual Meeting, 2010: pp. 1908-1913.

Zoran, "Data fusion technique for analysis of Vrancea seismic region, Romania," Proc. of SPIE, vol. 5239, 2004: pp. 395-402.

Sobel, "Spatial Differentiation —3 x 3 Window Table," Pattern Classification and Scene Analysis, John Wiley & Sons: New York, eds. Duda et al., 1973: pp. 271-272.

\* cited by examiner

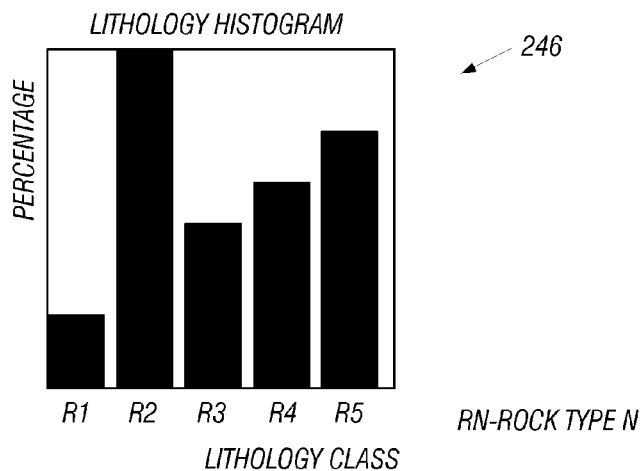

FIG. 11

| Map | Risk | Geomorphologic map |
|---|---|---|
| Logistic risk map | No or limited vehicle access | Escarpment map, terrain edges, soft clay and sabkha |
| | Difficult terrain for wheeled vehicles | Hard rough surface rock map |
| Scatter risk map | Scattering from topographic boundaries | Terrain edges, escarpments |
| | Scattering from lithologic boundaries | Changes in surface rock |
| Velocity risk map | Vibrator point loading risk | Hard and rough surface rock map |
| | High attenuation and risk of noise from trapped surface modes | Clay and sabkha map |

FIG. 12

| | Geomorphologic unit | Terrain [%] | Dominant Rock | Logistic risk | Data quality risk |
|---|---|---|---|---|---|
| 352 | Depression | 10 % | Sabkha, sand | Soft ground maneuver limitation | Attenuation reverberation |
| 354 | Plateau | 50 % | Sandstone, clay pans | No risk | No risk |
| 356 | Rough highland | 40 % | Limestone | Limestone maneuver limitation | Vibrator point loading |
| 358 | Escarpments | Few % | n/a | Access limitation | Scatter risk |

NEAR-SURFACE GEOMORPHOLOGICAL CHARACTERIZATION BASED ON REMOTE SENSING DATA

This application claims the benefit under 35 U.S.C. §119 (e) to U.S. Provisional Patent Application Ser. No. 61/104,977, entitled, "STATICS CORRECTION ESTIMATION FROM REMOTE SENSING DATA," which was filed on Oct. 13, 2008; U.S. Provisional Patent Application Ser. No. 61/104,980, entitled, "GENERATION OF LOGISTIC AND DATA QUALITY RISK MAPS FROM REMOTE SENSING BASED GEOMORPHOLOGIC ANALYSIS OF THE EARTH," which was filed on Oct. 13, 2008; and U.S. Provisional Patent Application Ser. No. 61/104,582, entitled, "RECONSTRUCTION OF A PRE-EROSION SURFACE," which was filed on Oct. 10, 2008. Each of these applications is hereby incorporated by reference in its entirety.

BACKGROUND

The invention generally relates to near-surface geomorphological characterization based on remote sensing data.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation reflect, refract or scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

The understanding of the surface and near-surface of a candidate region to be surveyed is paramount for such purposes as evaluating the candidate region for a potential survey and if selected for the survey, planning the survey and interpreting the results of the survey. For example, in a seismic survey in which a vibrator is to be used as the seismic source, some regions may not be suitable for the vibrator: relatively hard rock may result in point loading where only part of the baseplate of the vibrator is coupled to ground; and relatively soft ground may not support the hold down weight and thus, may compact during the sweep as well as undesirably absorb particularly high frequencies. Knowledge of the surface and near-surface may also be useful in evaluating the accessibility of the region for certain vehicles. For example, escarpments and soft ground may affect logistical access to the survey area. For post survey processing, the elastic properties of the near-surface typically are estimated for purposes of performing static corrections to the acquired seismic data.

SUMMARY

In an embodiment of the invention, a technique includes receiving first data belonging to a first type of remote sensing data for a region of interest and receiving second data belonging to a different second type of remote sensing data for the region of interest. The technique includes determining at least one geomorphological feature of the region of interest based at least in part on the first and second data.

Advantages and other features of the invention will become apparent from the following drawing, description and claims.

BRIEF DESCRIPTION OF THE DRAWING

FIG. 11 is an exemplary lithology histogram according to an embodiment of the invention.

FIG. 12 is a table illustrating information that may be conveyed by risk maps that are derived using near-surface geomorphological characterization based on remote sensing data according to an embodiment of the invention.

DETAILED DESCRIPTION

Figure 1:
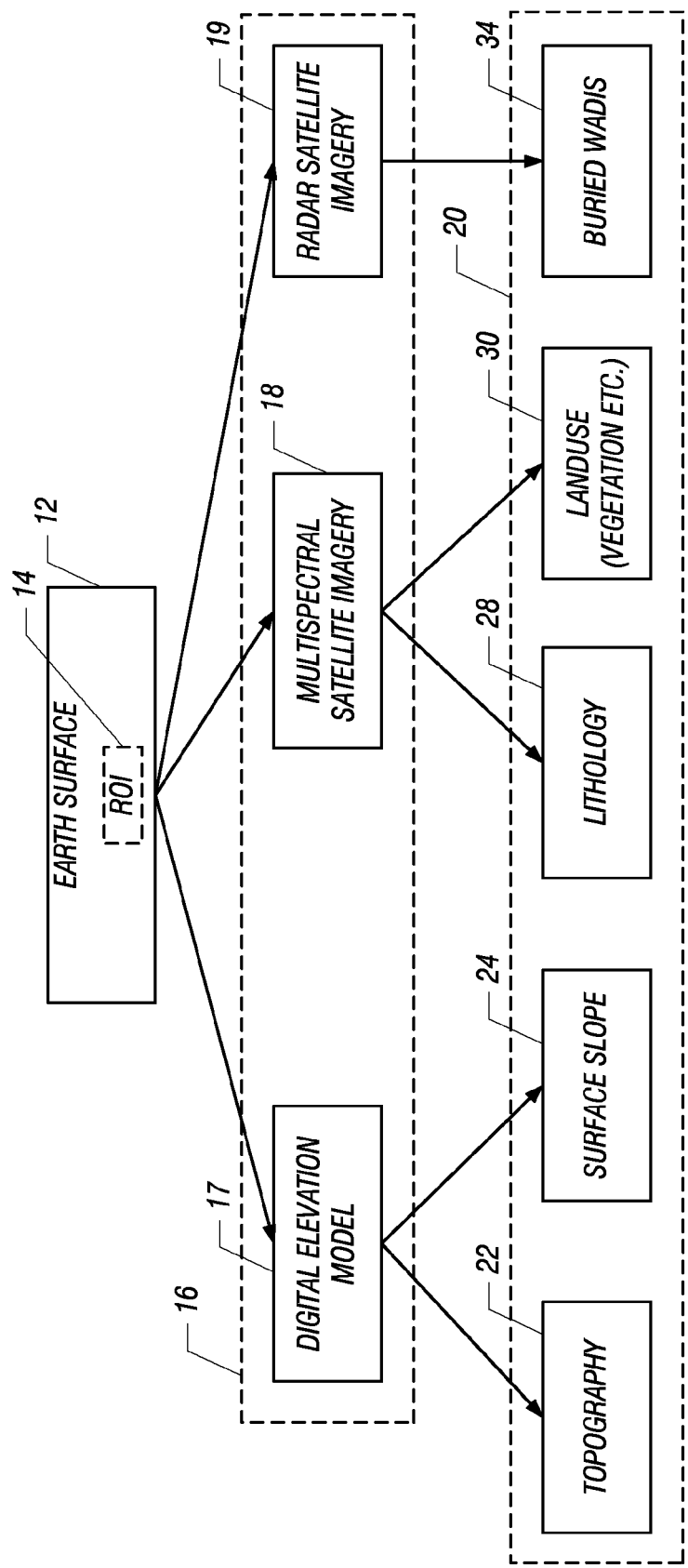
FIG. 1 is an illustration of the different types and uses of remote sensing data according to an embodiment of the invention.

Referring to FIG. 1, a seismic survey in a particular region of interest (ROI) 14 of the Earth's surface 12 may encounter various challenges due to the surface and near-surface characteristics of the ROI 14. To evaluate the ROI 14 for purposes of planning the survey and interpreting data acquired in the survey, remote sensing data 16 may be gathered. The remote sensing data 16 indicates various features 20 of the ROI 14, and may include, as an example, a digital elevation model 17, which indicates a topography 22 and surface slopes 24 of the ROI 14. The digital elevation model 17 may be acquired using satellite radar or light detection and ranging (LIDAR) technology, as non-limiting examples. The remote sensing data 16 may also include satellite-acquired multispectral imagery 18 that indicates the lithology 28 and land use (vegetation, etc) of the ROI 14; and satellite-acquired radar imagery 19, which may indicate the presence of one or more dry river beds, or wadis 34, in the ROI 14.

As described herein, the geomorphology of the ROI 14 is characterized for purposes of determining surface and near-surface features of the ROI 14. In general, geomorphology is the science of landforms, which studies the evolution of the Earth's surface and interprets landforms as records of geological history. As described below, the geomorphologic characterization is based on at least two different types of the remote sensing data 16.

As non-limiting examples and as further described herein, the near-surface geomorphological characterization may be used for such purposes as estimating and interpreting risks for the logistics involved in conducting a seismic survey in the ROI 14; estimating and interpreting risks that affect the quality of seismic data acquired in a seismic survey that is conducted in the ROI 14; determining static corrections to apply to seismic data acquired in the seismic survey; determining tectonic features of the ROI 14; and determining pre-erosion maps for the ROI 14.

Figure 2:
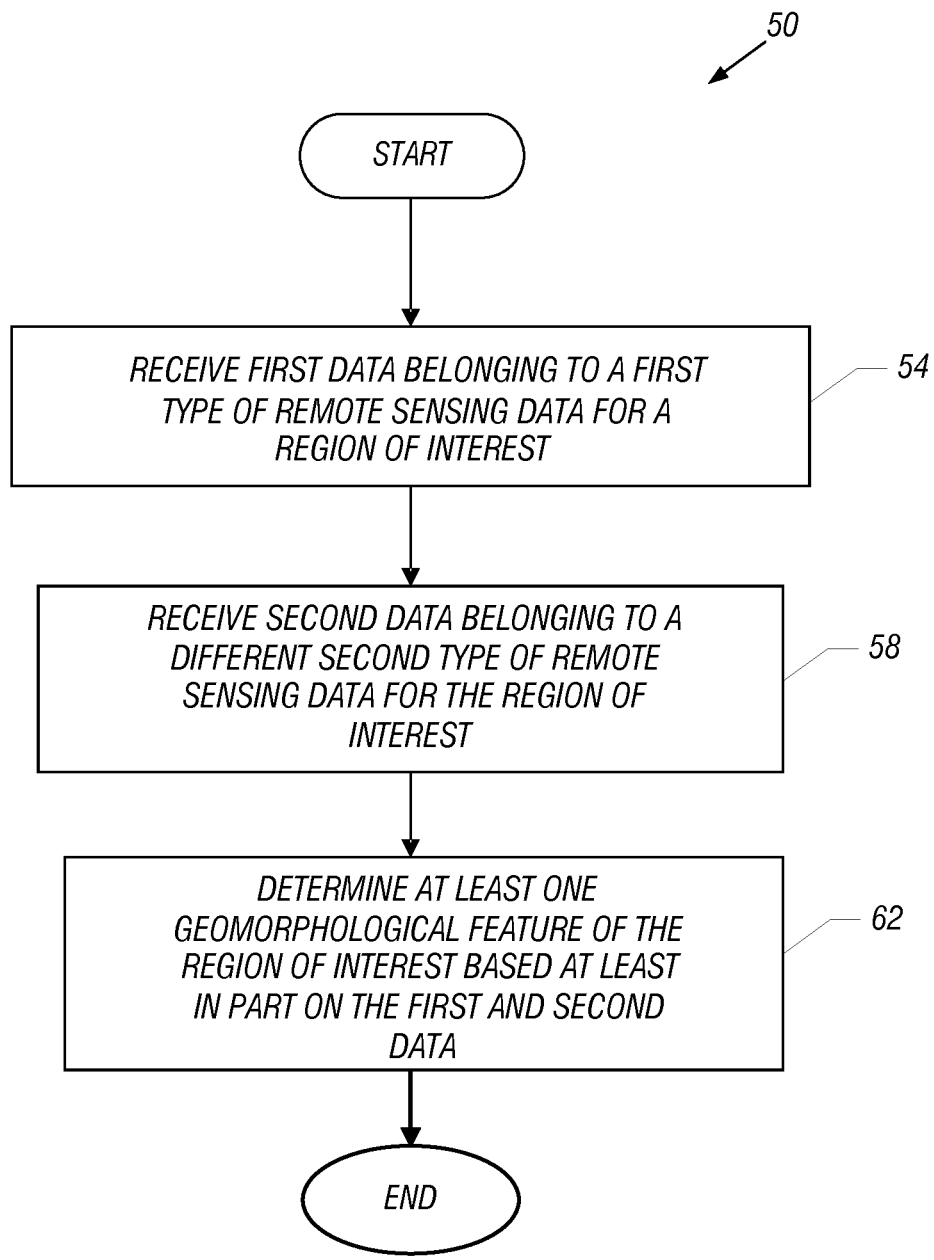
FIG. 2 is a flow chart depicting a technique to perform near-surface geomorphological characterization based on remote sensing data according to an embodiment of the invention.

Referring to FIG. 2 in conjunction with FIG. 1, in accordance with embodiments of the invention described herein, a technique 50 includes receiving (block 54) first data that belongs to a first type of remote sensing data for the ROI 14 and receiving (block 58) second data that belongs to a different second type of remote sensing data for the ROI 14. The technique 50 includes determining (block 62) at least one geomorphological feature of the ROI 14 based at least in part on the first and second data.

As a first example, the near-surface geomorphological characterization is used to assess risks in logistics and data quality in connection with a potential seismic survey to be conducted in the ROI 14. More specifically, in this application, the surface topography (derived from the digital elevation model 17) and the lithology (derived from satellite-acquired multispectral imagery 18) are linked together for purposes of generating the following risk maps: a logistic risk map, which highlights areas of the ROI 14 with access restrictions (areas that have limited vehicle access, areas that have limited access for wheeled vehicles, etc.); and a data quality risk map, which shows areas that pose a scattering risk to the data quality, areas that pose risks to the data quality related to surface velocities, etc.

As a more specific and non-limiting example, the logistic risk map may indicate regions with no or limited vehicle access due to such features as escarpments, terrain edges, soft clay and sabkha and may also indicate regions with difficult terrains for wheeled vehicles, such as areas with hard rough surface rock, for example.

The data quality risk map may indicate regions with a scattering risk due to topography boundaries, such as terrain edges and escarpments and regions with a scattering risk from lithology boundaries due to changes in the surface rock.

The risk map may also indicate risks related to surface velocities. For example, one type of velocity risk is a vibrator point loading risk, which results when only part of the base plate of the vibrator is coupled to ground.

The velocity risk map may also indicate regions with other types of velocity risks. For example, the map may indicate regions that are very soft and do not support the vibrator's hold down weight. These areas may compact during the sweep as well as absorb particularly high frequencies. Furthermore, the map may indicate areas that pose velocity risks due to the elastic properties of the geological layers in the near-surface, their shape and layering, etc., which affects reception of seismic signals by the seismic receivers. In this manner, the surface wavefield is recorded by the seismic receivers together with a body wavefield that contains the target reflections. The surface layers and their elastic properties determine the quality of the coupling of the receivers to the seismic wavefield.

In determining the risk maps, the topography (derived from the digital elevation model 17) and lithology (derived from the satellite-acquired multispectral imagery 18) are jointly interpreted because the shape of the Earth's surface is determined by the resistance of the rock layers against erosion and by their layering. Therefore, by combining the remote sensing data indicative of the topography and lithology, the surface information that is acquired from the remote sensing may be extended into the near-surface.

For purposes of generating the risk maps, a spatial statistical analysis of the digital elevation model 17 is performed to classify the topography, and a spectroscopic analysis of the satellite-acquired multispectral imagery is performed to classify the surface rock types. The combination of the two classifications provides the geomorphologic classification of the surface and the near-surface; and risk maps for logistics and data quality may be determined from this geomorphologic classification. As described herein, histograms may be used to provide clues about the severity of the risks and may serve as a valuable ingredient for risk mitigation.

Figure 3:
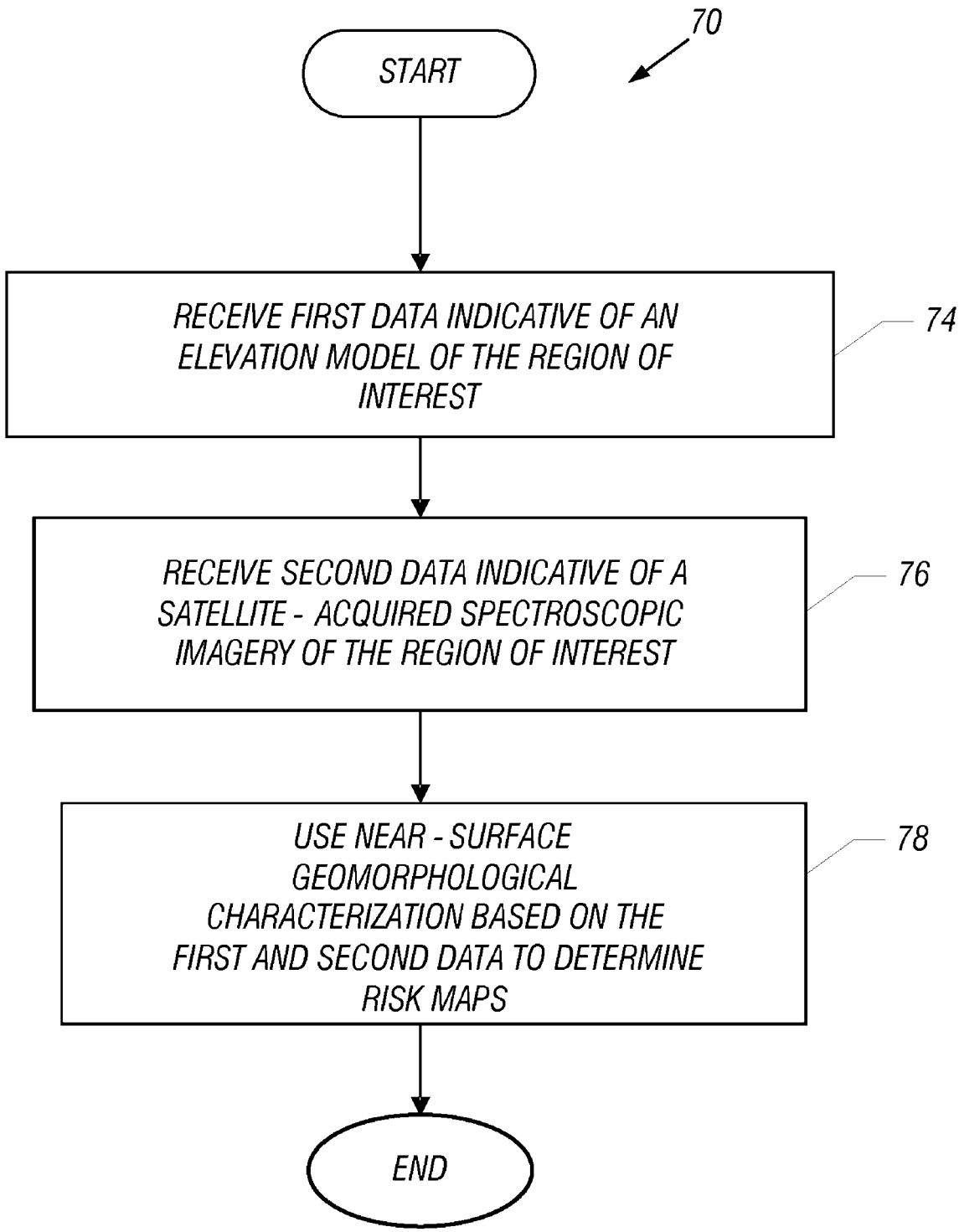
FIG. 3 is a flow chart depicting a technique to use remote sensing data to determine a risk map using near-surface geomorphological characterization based on remote sensing data according to an embodiment of the invention.

Thus, referring to FIG. 3 in conjunction with FIG. 1, in accordance with embodiments of the invention, a technique 70 to generate risk maps includes, in general, receiving (block 74) first data that is indicative of a digital elevation model 17 of the ROI 14 and receiving (block 76) second data indicative of a satellite-acquired spectroscopic imagery 18 of the ROI 14. The technique 70 includes using (block 78) the geomorphological near-surface characterization based on the first and second data to determine risk maps.

Figure 4:
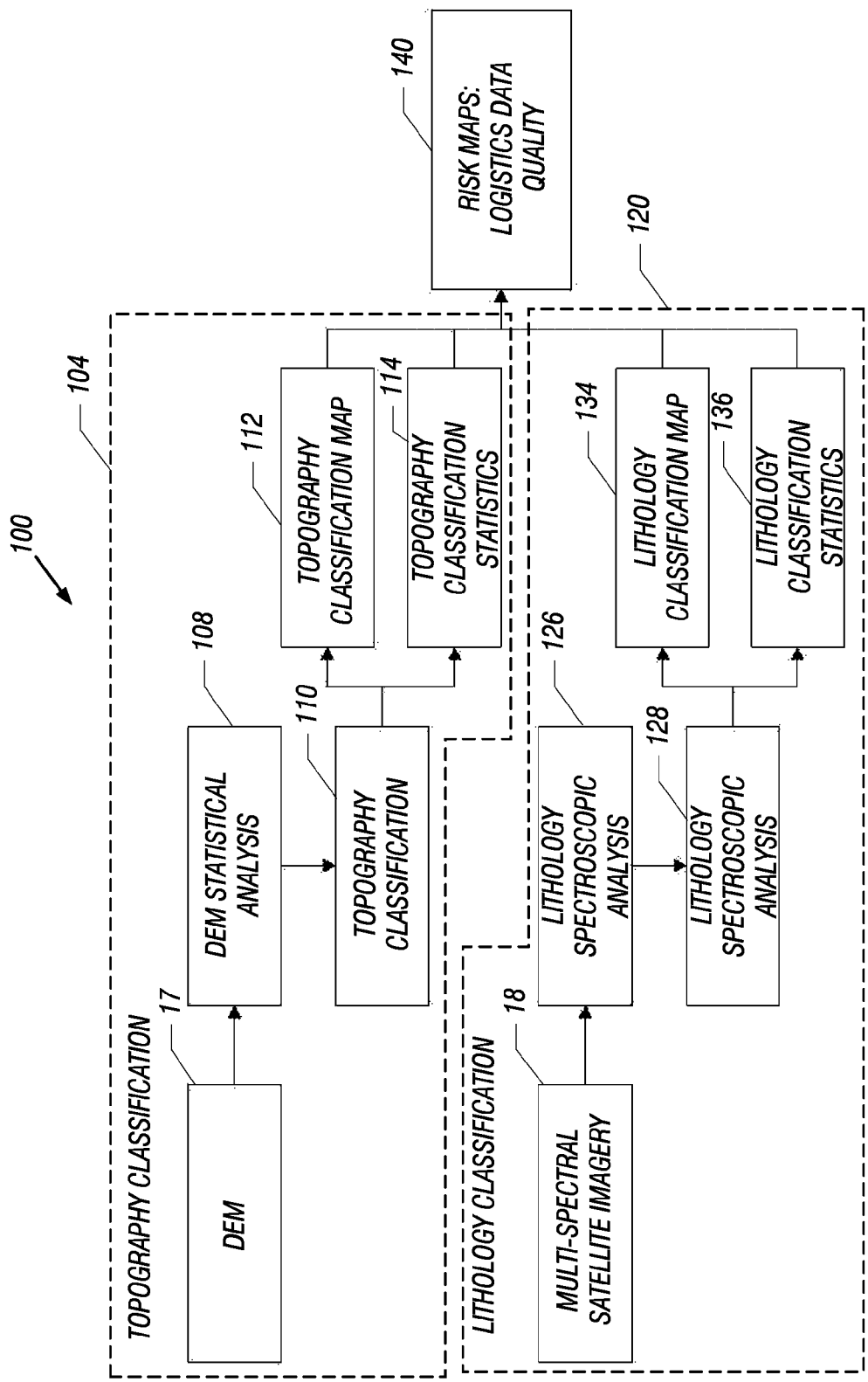
FIG. 4 is an illustration of a work flow for generating risk maps using near-surface geomorphological characterization based on remote sensing data according to an embodiment of the invention.

FIG. 4 generally depicts a work flow 100 for generating logistics and data quality risk maps 140 in accordance with embodiments of the invention. Referring to FIG. 4 in conjunction with FIG. 1, the work flow 100 involves determining topography classification (block 104) as well as determining lithology classification (block 120).

The topography classification 104 involves performing a statistical analysis 108 of the digital elevation model 17, pursuant to block 108, to derive a topography classification 110. The topography classification 110 determines the terrains (dipping plateau, rough terrain, escarpments, etc.) that are present in the ROI 14; produces a classification map 112, which highlights the terrain boundaries; and generates classification statistics 114, which set forth the relative percentages of the terrain types.

The lithology classification 120 begins with a spectroscopic analysis (block 126) of the satellite-acquired multi-spectral imagery 18 for purposes of generating a lithology classification 128, which identifies the various minerals in the ROI 14. A lithology classification map 134, which shows the boundaries of similar rock building minerals, as well as lithology classification statistics 136, which sets forth the relative percentages of the identified minerals may be generated based on the lithology classification 128.

Figure 5:
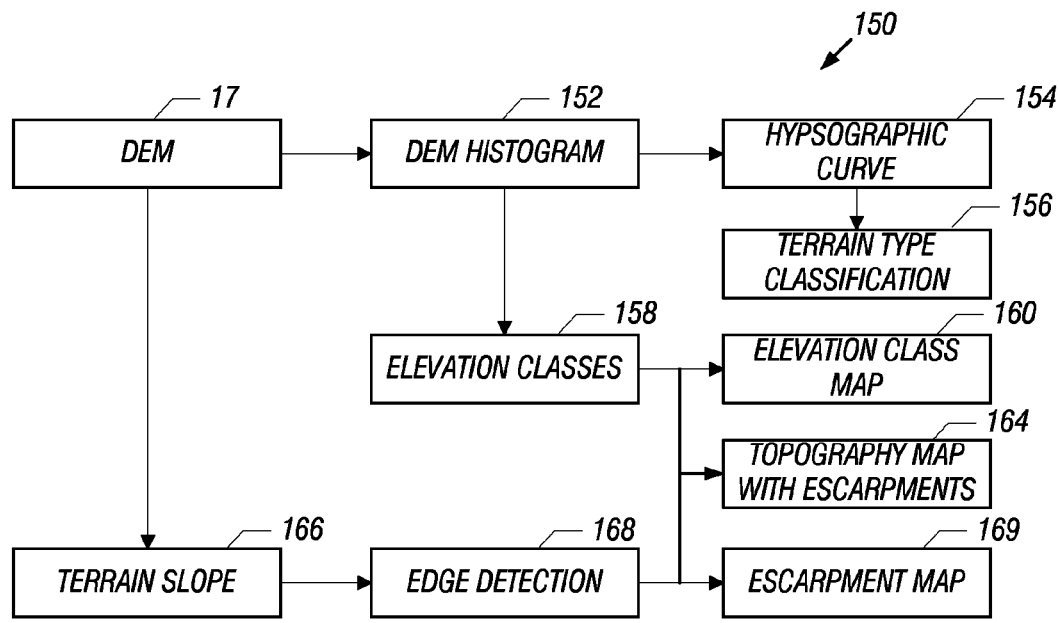
FIG. 5 is an illustration of a work flow for determining a topography classification based on a digital elevation model according to an embodiment of the invention.

As a more specific example, in accordance with embodiments of the invention, a work flow 150 that is depicted in FIG. 5 may be used for purposes of determining the topographic classification. Referring to FIG. 5 in conjunction with FIG. 1, pursuant to the work flow 150, a histogram 152 of the elevations is determined from the digital elevation model 17. From the histogram 152, a hypsographic curve 154 is derived, and from the hypsographic curve 154, a terrain type classification 156 is derived. Also, from the histogram 152, elevation classes 158 are determined, which allows the derivation of an elevation class map 160, topography class map with escarpments 164 and an escarpment map 169. The generation of the escarpment map 169 is further aided by the detection of the boundaries of the escarpments by an edge detection algorithm 168, which detects the boundaries based on a terrain slope 166 that is indicated by the digital elevation model 17.

Figure 6:
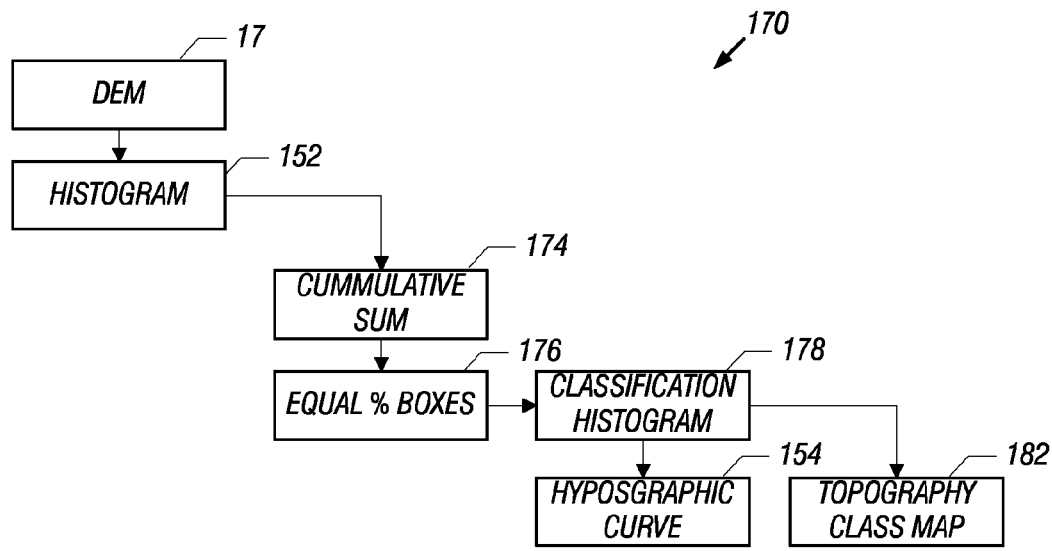
FIG. 6 is an illustration of a data flow for determining a topographic classification according to an embodiment of the invention.

FIG. 6 depicts a data flow 170 for performing the topographic classification according to an embodiment of the invention. The topographic classification begins with determining the histogram 152 based on the digital elevation model 17. The population quantities for each equally-spaced elevation class are then summed (boxes 174 and 176) to form a classification histogram 178 and the hypsographic curve 154. Statistical analysis of the classification histogram 178 provides information about the terrain type and geomorphological features such as plateaus, escarpments and rough terrain.

Figure 7:
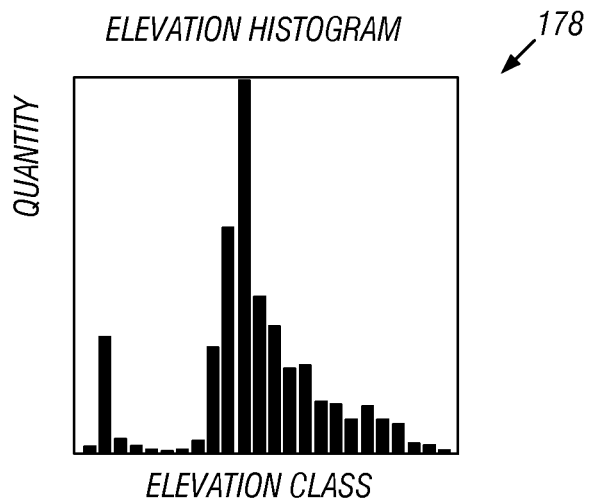
FIG. 7 depicts an exemplary elevation histogram according to an embodiment of the invention.
Figure 8:
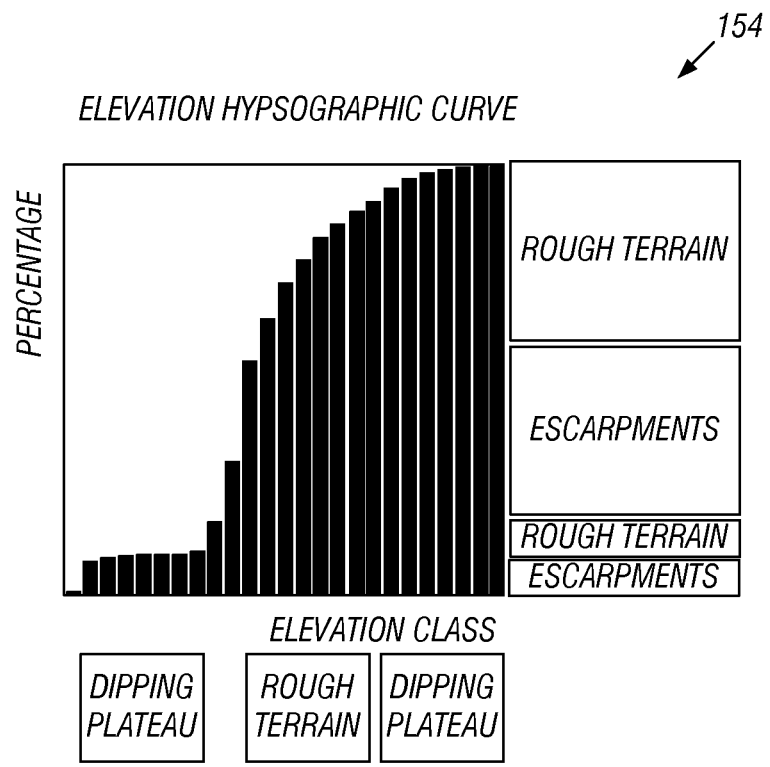
FIG. 8 depicts an exemplary elevation hypsographic curve according to an embodiment of the invention.

Referring to FIGS. 7 and 8 in conjunction with FIG. 6, FIG. 7 depicts an exemplary classification histogram 178, and FIG. 8 depicts the corresponding exemplary elevation hypsographic curve 154. The hypsographic curve 154 is generated from the accumulation of the quantities in the histogram 178 from small to large elevation values. The shape of the hypsographic curve 154 reflects the geomorphologic character of the region of interest. Extracting information about the terrain type and selecting elevation boundaries for statistical analysis is generally easier with a hypsographic curve because escarpments, plateaus and rough topology may be interpreted more easily. Furthermore, terrain classes may be chosen by using a percentage scale rather than by specifying distinct values. Therefore, based on the classification histogram 178 (FIG. 6), a topography class map 182 may be constructed.

Figure 9:
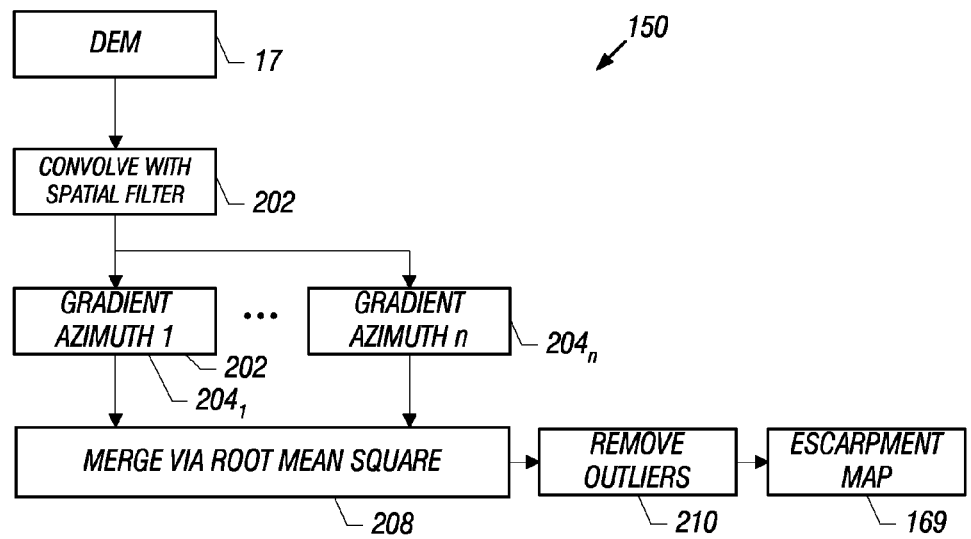
FIG. 9 is a schematic diagram depicting a data flow for detecting topography edges according to an embodiment of the invention.

FIG. 9 depicts a data flow 200 for determining the escarpment map 169, according to an embodiment of the invention. Referring to FIG. 9 in conjunction with FIG. 1, the detection of escarpments is particularly important for the logistic and data quality risk maps. Escarpments may be extracted from the gradient of the digital elevation model 17. For a complex terrain, the gradient often shows striations in the orthogonal directions originating from the orthogonal direction for obtaining the spatial derivative. To solve this problem for complex terrains with gradients in all directions, a multi-azimuth edge detection algorithm may be used, such as the one that is set forth in Sobel, I., Feldman, G., "*A 3×3 Isotropic Gradient Operator For Image Processing,*" presented at a talk at the Stanford Artificial Project in 1968, unpublished but often cited in the following reference: PATTERN CLASSIFICATION AND SCENE ANALYSIS, Duda, R. and Hart, P., John Wiley and Sons, 1973, pp 271-272. Multi-azimuth detection algorithms, other than the one described above may be used in accordance with other embodiments of the invention.

Pursuant to a multi-azimuth edge detection algorithm, the digital elevation model 17 is convolved (block 202) with a spatial filter to produce n gradient azimuths 204 (gradient azimuths $204_1$ and $204_n$ being depicted in FIG. 9, as examples). The gradients 204 are merged via a root mean square (block 208), and the outliers are removed (block 210) to generate the escarpment map 169.

Figure 10:
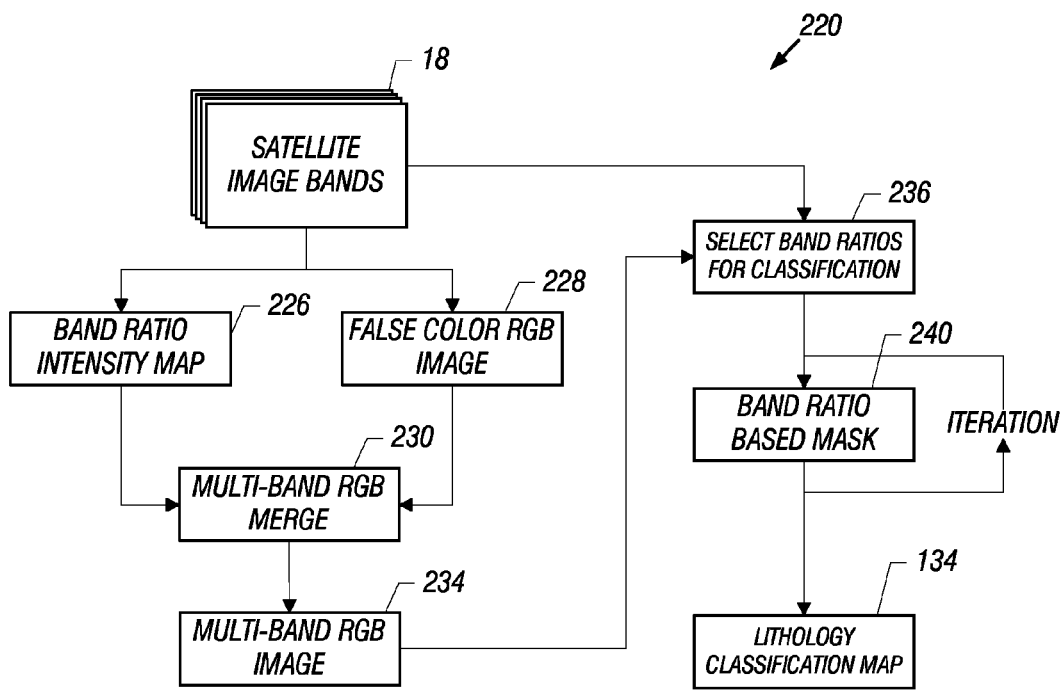
FIG. 10 is an illustration of a work flow for determining lithology classification using satellite-acquired multispectral imagery according to an embodiment of the invention.

In accordance with some embodiments of the invention, a work flow 220, which is depicted in FIG. 10, may be used for purposes of performing lithology classification. Referring to FIG. 10 in conjunction with FIG. 1, pursuant to the work flow 220, satellite-acquired multi-spectral images 18 are selectively combined to create band ratio images 226. A band ratio image 226 may be created, for example, on a pixel by pixel basis, by dividing each pixel intensity of one of the images 18 by the pixel intensity at the same pixel location of another one of the images 18. The band ratio images 226 may be combined to also produce one or more false color red-green-blue (RGB) images 228. Furthermore, these images may be selectively combined to produce a multi-band RGB image 234, which may aid in visualizing the lithographic classification process.

A given band ratio combination may be more helpful than other ratio band combinations for purposes of discriminating different minerals, such as carbonates, clastics, clay and sabkha. Therefore, in the lithology classification, a given band ratio combination is selected (block 236) for analysis for purposes of detecting one or more of the minerals. For each mineral to be detected, an iteration is performed in which a pixel value threshold for detecting the mineral is selected, and then only pixel values in the evaluated band combination, which exceed the threshold are registered in a corresponding mask 240 that highlights the mineral. The masks are combined to generate the lithology classification map 134. As non-limiting examples, the masks 240 may include hard rock masks, clay masks and soft rock masks.

Spatial statistical analysis of the lithologic classification provides the percentage distribution of different minerals in the region of interest. FIG. 11 depicts an exemplary lithology histogram 246 that may be part of such a statistical analysis, where the different rock types are labeled R1 to R5.

The merger of the topographic and lithologic classification permits the generation of risk maps for logistic and data quality risks. FIG. 12 is an illustration 250 of the information that may be conveyed by logistic and data risk maps according to some embodiments of the invention. A logistic risk map 252 may indicate regions with risks of limited access or no access for difficult terrain for wheeled vehicles. The no or limited vehicle access risks may be due to escarpments, terrain edges, soft clay and/or sabkha. The risks for wheeled vehicles may be due to hard rough surface rocks.

A scatter risk map 256, one type of data quality risk map, may indicate regions with risks due to scattering from topographic boundaries due to terrain edges and escarpments; and regions with risks due to scattering from lithologic boundaries due to changes in the surface rock. Another type of data quality risk map is a velocity risk map 260 that may indicate regions with risks attributable to vibrator point loading due to hard and rough surfaces and regions with risks due to high attenuation and risk noise from trapped surface modes due to clay and sabkha.

Figure 13:
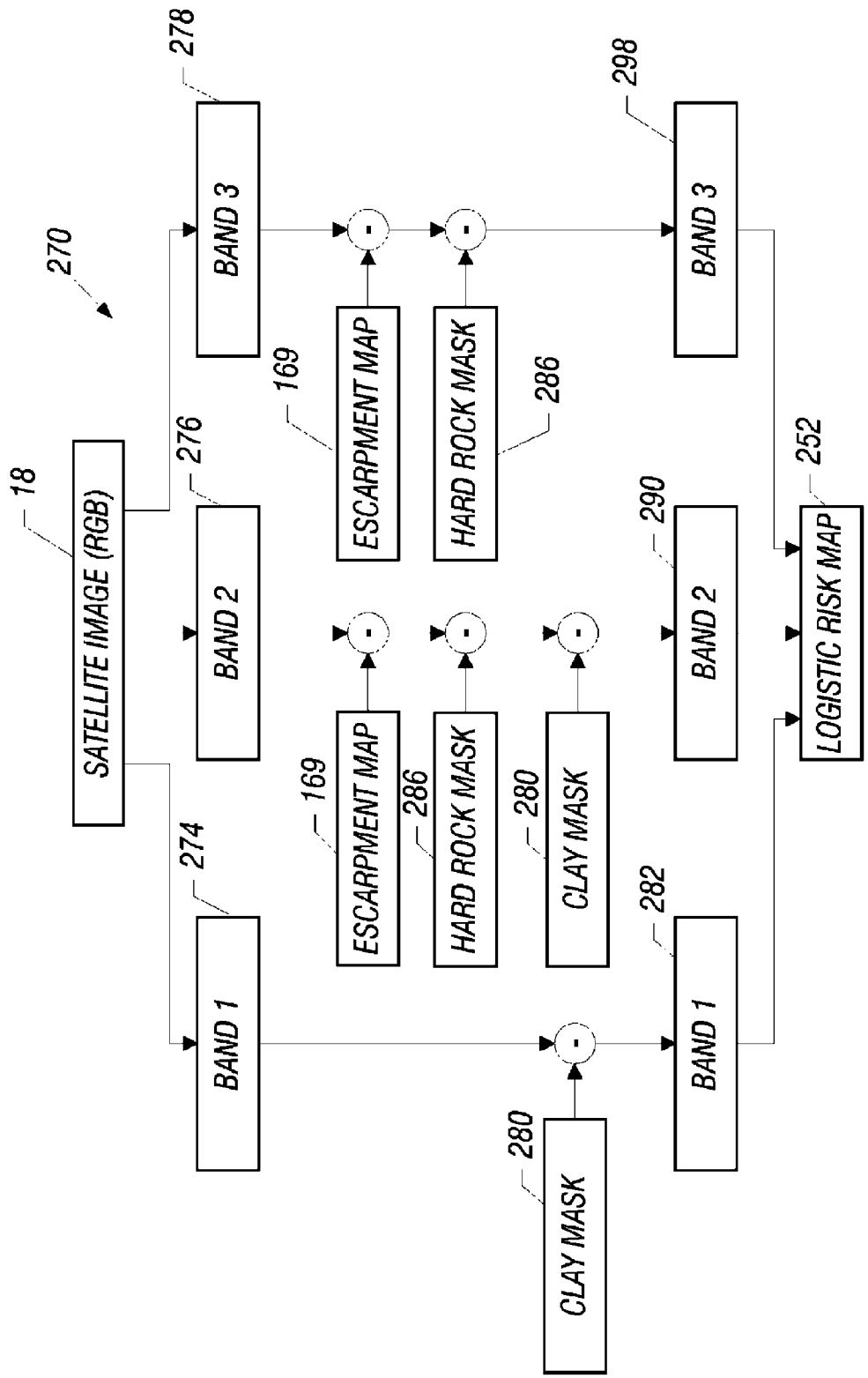
FIG. 13 is an illustration of a work flow for generating a logistic risk map according to an embodiment of the invention.

FIG. 13 depicts an exemplary work flow 270 for merging the lithographic and topographic maps to produce the logistic risk map 252 in accordance with some embodiments of the invention. As shown in FIG. 13 three bands 274, 276 and 278 are derived from the satellite-acquired multispectral imagery 272. As a non-limiting example, the bands 274, 276 and 278 may be each be associated with a different primary color, such as a primary color that is selected from the red, green and blue primary color set. As described below, the bands 274, 276 and 278 are modified based on topography and lithology analyses for purposes of producing the logistic risk map 252.

More specifically, for the example that is depicted in FIG. 13, a clay mask 280 is used to remove selected portions of the first band 274, which correspond to the clay regions to produce a modified first band 282. The escarpment map 169, a hard rock mask 286 and the clay mask 280 are used to remove selected portions of the second band 276, which correspond to the escarpments, hard rock and clay regions, respectively, to produce a modified second band 290. The escarpment map 169 and the hard rock mask 286 are used to spatially remove selected portions of the third band 276, which correspond to escarpment and hard rock regions, respectively, to produce a modified third band 298. Due to this processing, the primary color that its associated with the modified first band 282 indicates the escarpments and hard rock areas in the band 282; the primary color that its associated with the modified second band 290 indicates the areas, which are not associated with escarpments, hard rock areas and clay areas; and the primary color that its associated with the modified third band 298 indicates the clay areas. The work flow 270 involves overlaying the bands 282, 290 and 298 to produce a composite image that forms the logistic risk map 252, in accordance with some embodiments of the invention.

Figures 14, 15:
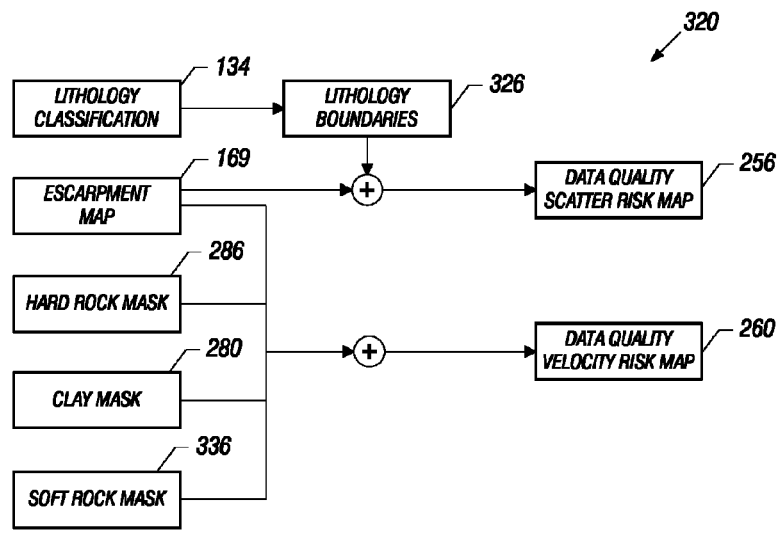
FIG. 14 is an illustration of a work flow for generating a data quality scatter risk map and a data quality velocity risk map according to an embodiment of the invention.
FIG. 15 depicts an exemplary statistical analysis of logistic and data quality risks according to an embodiment of the invention.

FIG. 14 generally depicts a work flow 320 for generating the data quality scatter risk map 256 and a data quality velocity risk map 260, in accordance with some embodiments of the invention.

The data quality scatter risk map 256 indicates features of the surface and near-surface, which pose risks to scattering seismic data. In this regard, the data quality risk map 256 indicates topographic features, such as terrain edges and escarpments; and the data quality risk map 256 indicates lithologic boundaries that represent sharp boundaries between rocks of very different elastic properties, such as sandstone and limestone. Therefore, the generation of the data quality scatter risk map 256 involves combining the escarpment map 169 and lithology boundaries 326, as determined from the lithology classification map 134.

The data quality velocity risk map 260 considers the risks due to source and receiver data quality aspects. For example, from the source side, for hard rock and rough terrain, a very reduced coupling may occur between the baseplate of the vibrator and the ground. This phenomenon is called point loading, and often results in high distortion of the vibrator sweep signal, which is transmitted into the ground. The risk for point loading of the vibrator baseplate is therefore captured by the hard rock features of the data quality velocity risk map 260.

As another example of a potential velocity risk, from the receiver side, the near-surface at a receiver may contain very soft surface material, such as clay or sabkha. If clay is deposited in a pan between hard rock layers, surface waves tend to become trapped, which results in ringing noise and consequently high noise levels. Often clay and sabkha also show high attenuation, especially for high frequency seismic signals. Therefore, the risk for trapped modes and high attenuation is captured by the clay features of the data quality velocity risk map 260.

In accordance with some embodiments of the invention, the generation of the data quality velocity risk map 260 involves combining the escarpment map 169, the hard rock mask 286, the clay mask 280 and a soft rock mask 336.

The statistical analysis of the logistic and data quality risks may be summarized in a risk assessment table, which is useful for survey design and risk management. Table 350, which is depicted in FIG. 15, is an example of one such table. Referring to FIG. 15, for a depression 352 (approximately 10 percent of the terrain for this example) in which the dominant rock is sabkha and sand, there are maneuvering limitations for vehicles, due to the soft ground and potential attenuation reverberations that pose a data quality risk. For the plateaus 354, which constitute 50 percent of the terrain in this example, the dominant rock is sandstone and clay pans, and there is no data quality or logistic risk for these regions. For the rough highlands regions 356, which constitute approximately 40 percent of the terrain for this example, the dominant rock is limestone. The limestone presents a logistic risk due to the potential difficulties and maneuvering vehicles. Furthermore, there is a vibrator point loading risk. The terrain also includes a few escarpments 358, which pose an access limitation logistic risk and a scatter risk for the data quality.

As another example of another geomorphological feature that may be determined based on remote sensing data, the near-surface geomorphological characterization may be used for purposes of static corrections. Variations in the near surface produce static fluctuations in the corresponding seismic data. Static corrections are therefore needed to compensate for time shifts that are caused by topography variations and variations in the velocity of the seismic waves in the near-surface. The above-described topographic and lithologic classification allows the generation of a three-dimensional (3-D) near surface geologic model, and using standardized elastic properties for the rock types identified in the classification step, the 3-D geological model may be converted into a 3-D elastic model. Statics estimates are made assuming vertical propagation of the seismic waves through the layers of the elastic model.

Figure 16:
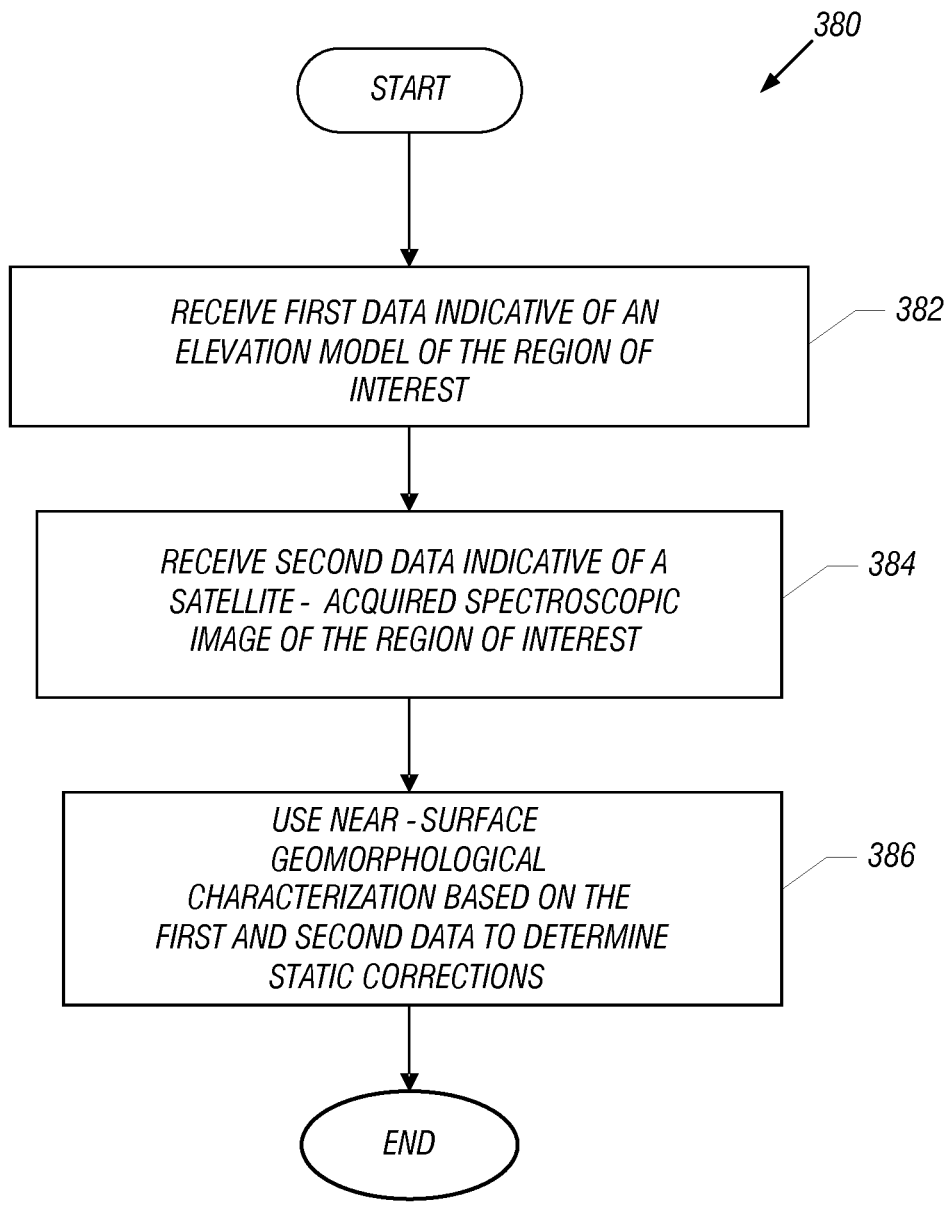
FIG. 16 is a flow diagram depicting a technique to determine static corrections using near-surface geomorphological characterization based on remote sensing data according to an embodiment of the invention.

Thus, referring to FIG. 16, a technique 380 that may be used in accordance with some embodiments of the invention includes receiving (block 382) first data that is indicative of an elevation model of a region of interest and receiving (block 384) second data that is indicative of a satellite-acquired spectroscopic image of the region of interest. The technique 380 includes determining (block 386) static corrections based at least in part on the first and second data.

Figure 17:
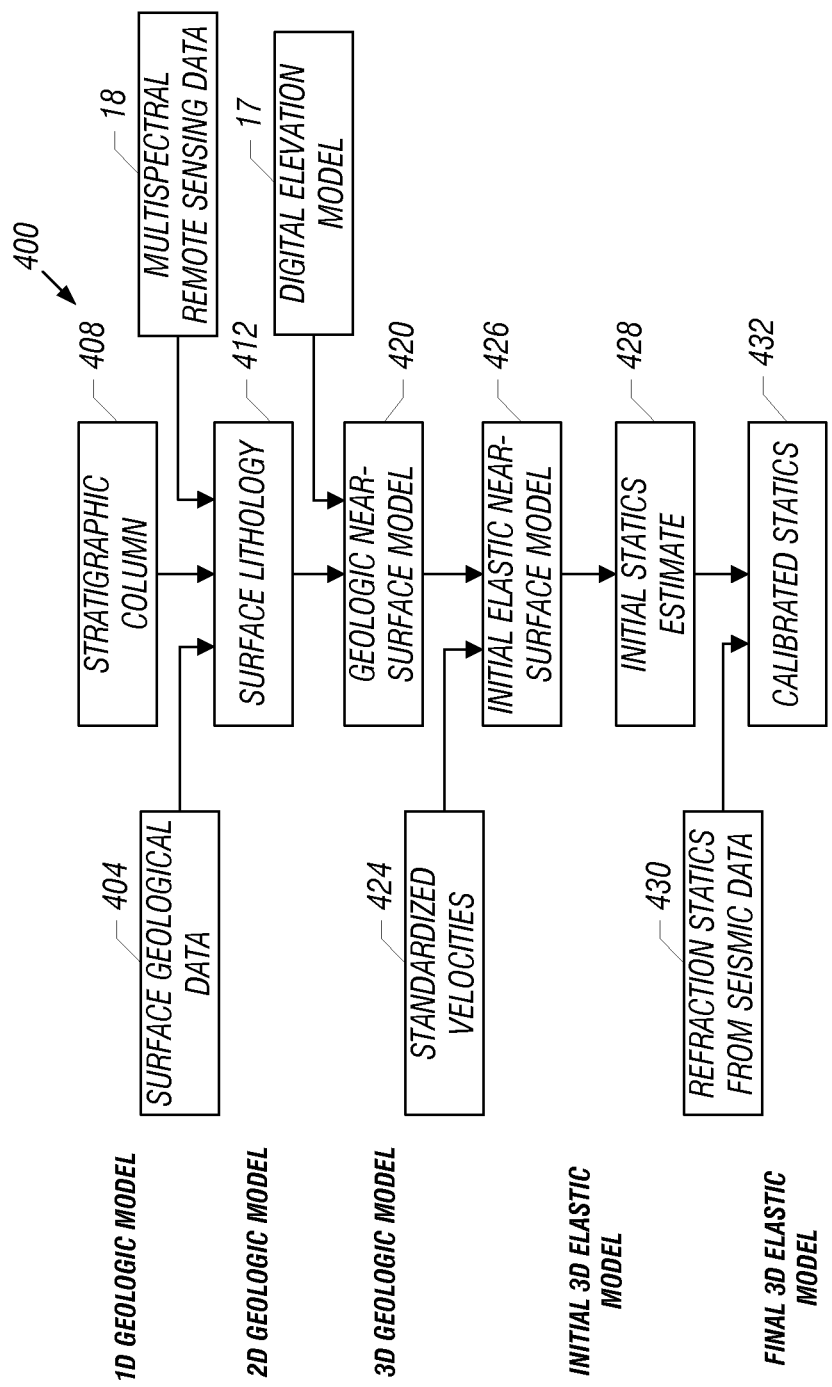
FIG. 17 is an illustration of a work flow to estimate statics from a digital elevation model and satellite-acquired multispectral imagery according to an embodiment of the invention.

As a more specific example, FIG. 17 illustrates an exemplary work flow 400 for estimating statics from the digital elevation model 17 and satellite-acquired imagery 18 according to an embodiment of the invention. More specifically, the work flow 400 uses the digital elevation model 17 for topographic characterization and uses the satellite-acquired multispectral imagery 18 for mineral discrimination and surface lithology characterization.

Referring to FIG. 17 in conjunction with FIG. 1, the work flow 400 begins with using stratigraphic column data 408 to identify the geologic units and their geologic context. The satellite-acquired multispectal imagery 18 is then used in combination with the stratigraphic column data 408 to generate a surface lithology map 412, which is calibrated with surface geological field data 404. The digital elevation model 17 is combined with the determined surface lithology 412 to generate a 3-D geologic near surface model 420.

The 3-D geological near surface model 420 may be converted into an initial elastic near-surface model 426 using standardized velocities 424 and elastic parameters for the rocks identified from the satellite-acquired imagery 18. From the model 426, initial statics estimates 428 may be made, and these estimates may be calibrated 432 by using refraction statics 430 from acquired seismic data.

It is important to note that the spatial density for the statics estimates, which can be achieved by interpreting remote sensing data, is determined only by the resolution of the satellite image. In most cases, short wave infrared satellite imagery has been used for proper mineral discrimination, which defines a limit of around ten meters for the estimation of statics. The core of the technique is the characterization and classification of the surface topography and the near surface lithology. For proper correction of the statics, it is important to understand the geomorphology of the area of the seismic survey, i.e., to understand how the topography is determined by the near surface lithology.

Figure 18:
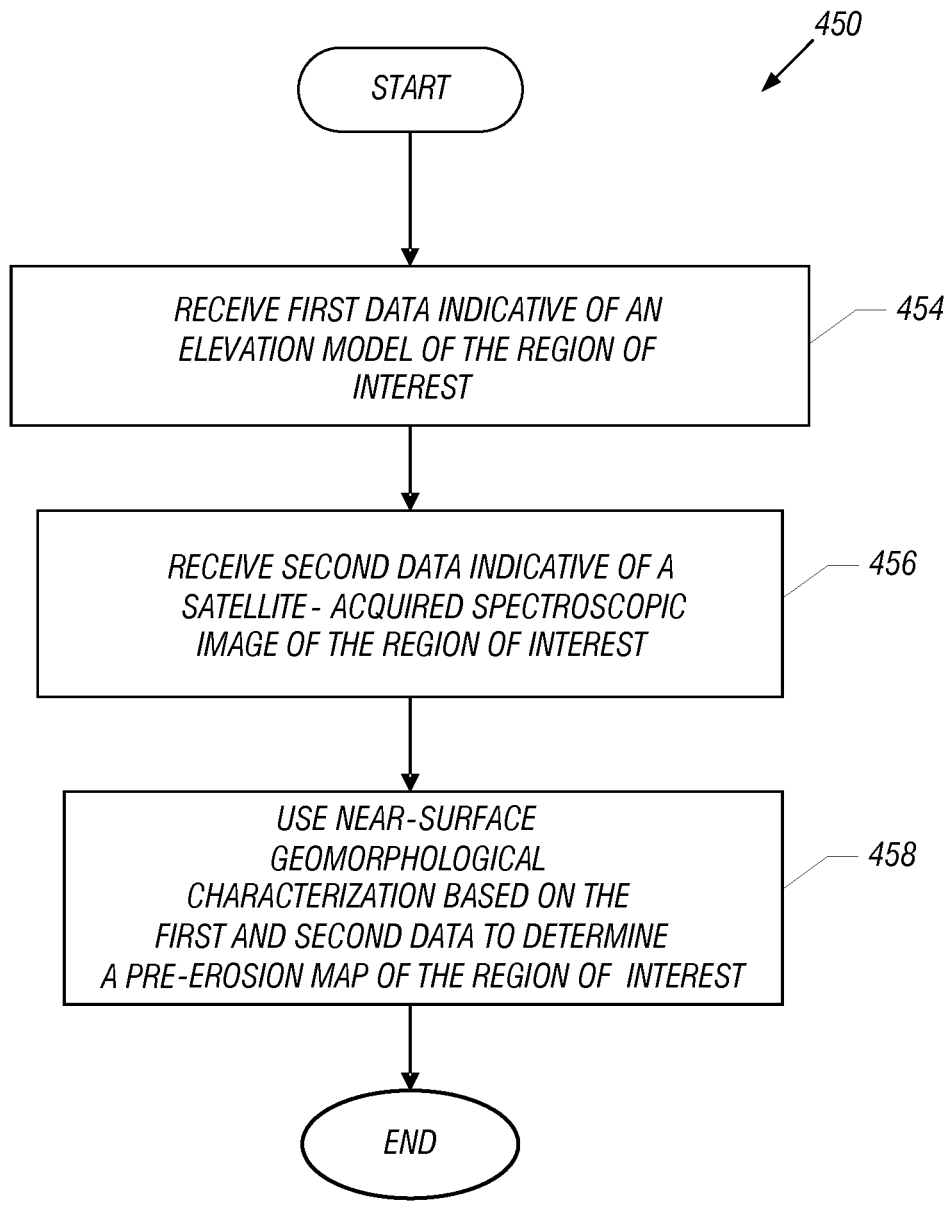
FIGS. 18 and 19 are flow charts depicting techniques to determine a pre-erosion map using near-surface geomorphological characterization based on remote sensing data according to embodiments of the invention.

The geomorphological characterization of the near surface may also be used for purposes of performing tectonic mapping. In this regard, referring to FIG. 18, in accordance with some embodiments of the invention, a technique 450 includes receiving (block 454) first data that is indicative of a digital elevation model and receiving (block 456) second data that is indicative of a spectroscopic image of the region of interest. A pre-erosion map of the region of interest may then be determined based on the first and second data, as set forth in block 458.

More particularly, the joint interpretation of digital elevation models and multi-spectral remote sensing data in connection with stratigraphic and geologic information reveals the geologic structure of the Earth's surface, particularly in desert terrain. The characterization and classification of the digital elevation model 17 using spatial statistics provides hints for formation tops, which are validated by the mineral spectroscopy of multi-spectral remote sensing data. The idea behind this approach is that the topography of the Earth's surface is the result of geological processes such as deposition, erosion and tectonics.

Figure 19:
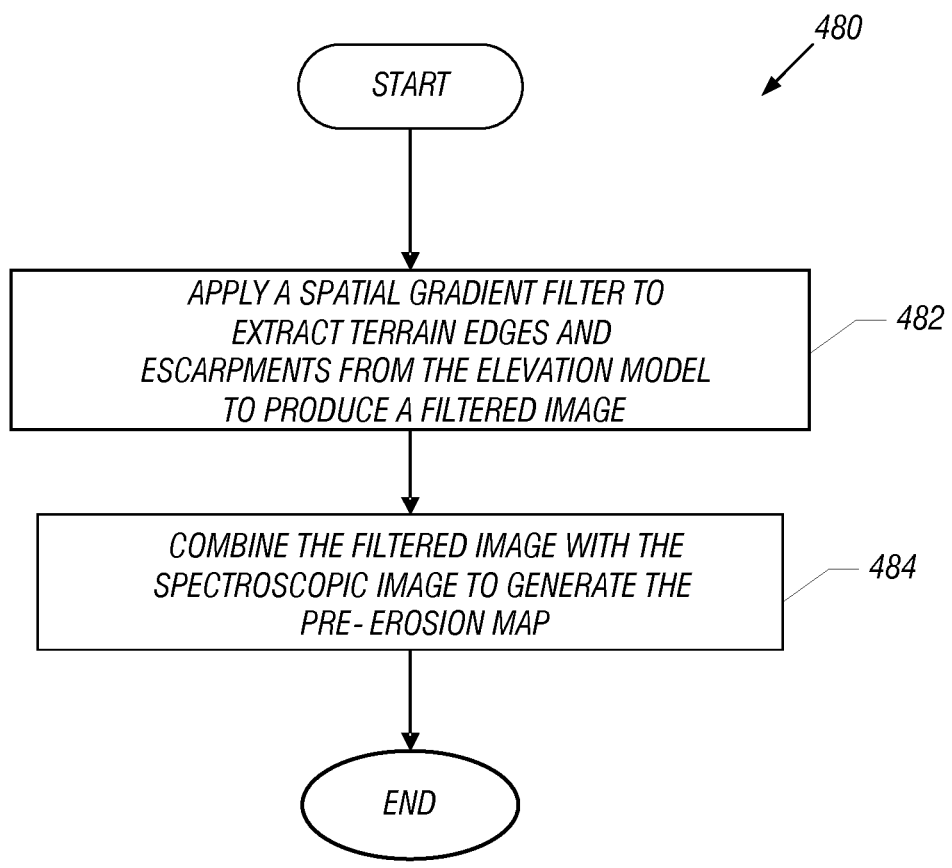

In accordance with some embodiments of the invention, a technique 480, which is depicted in FIG. 19, may be used for purposes of developing the pre-erosion map. Pursuant to the technique 480, the digital elevation model is analyzed (block 482) for geomorphologic terrain classes such as tableland and terrain edges and escarpments are extracted using a spatial gradient filter. In hard rock areas, the escarpments often delineate valleys, which follow fault lines. The multispectral satellite images are then combined (block 484) to form a multi-band RGB image, which reveals the different rock types in certain areas. The rocks exposed as outcrops may be associated with their elevation use using the digital elevation model. From the relative elevations, the position sequence may be obtained and hence, a stratigraphic column. Combined with the tectonic lineaments extracted from the escarpments of the digital elevation model, the tectonic features may be identified. In accordance with some embodiments of the invention, the pre-erosion map may indicate a graben between normal faults, and the throw of the graben may be determined from the map.

In accordance with embodiments of the invention, interpreted irregularities in the shape of wadi systems may be used to identify active faults. The wadi system may be identified, in accordance with some embodiments of the invention, using a technique that is based on the response of thermal infrared satellite imagery to moisture. More specifically, wadis, which contain slightly higher quantities of moisture than the surrounding terrain, give a "cool" response in the thermal infrared image.

Figure 20:
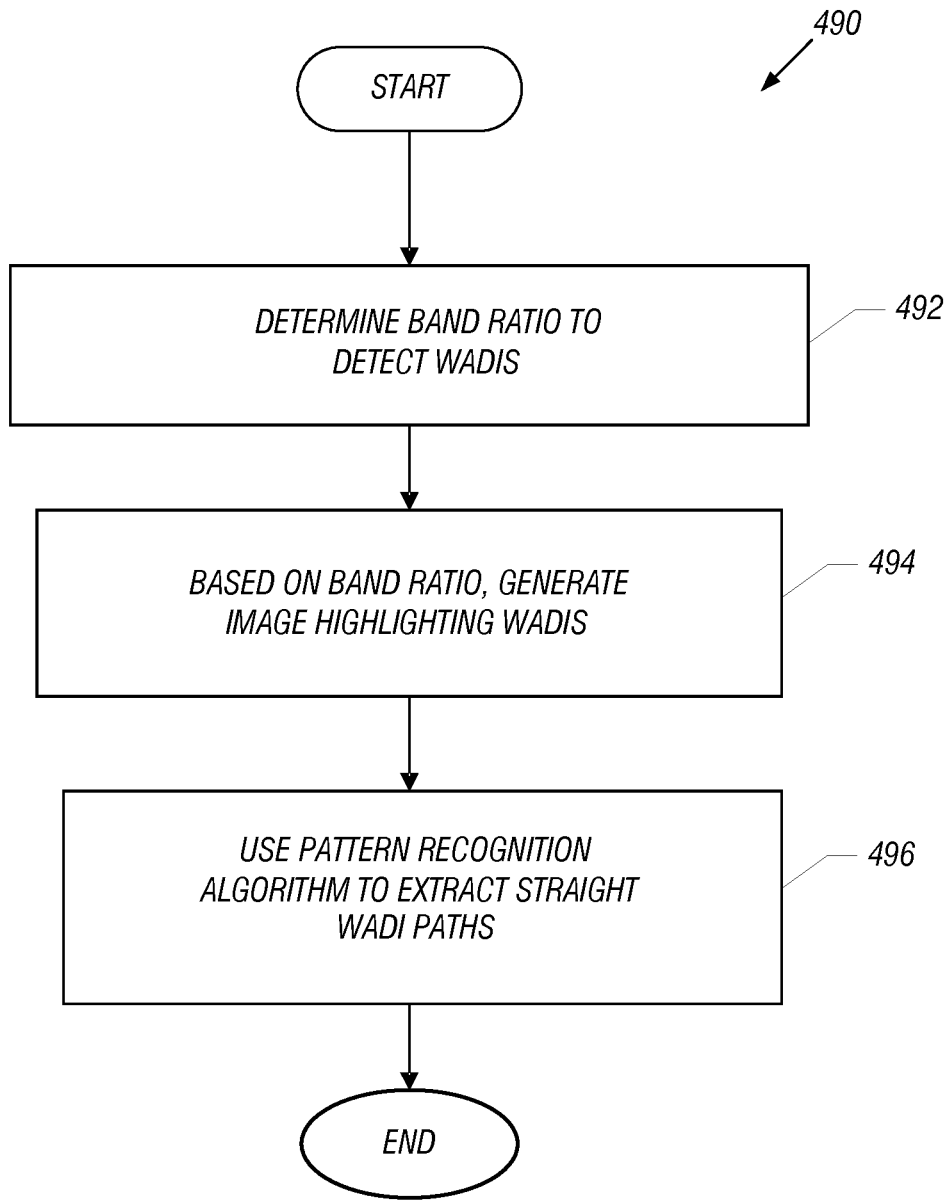
FIG. 20 is a flow chart depicting a technique to identify active faults using near-surface geomorphological characterization based on remote sensing data according to an embodiment of the invention

Referring to FIG. 20, a technique 490 to identify active faults may proceed as follows. First, the technique includes determining (block 492) a band ratio to detect wadis. The band ratio refers to the ratio of intensities of two bands of the satellite multispectral imagery 18, which are processed according to the determined ratio to produce a band ratio image in which the wadis are highlighted. As a non-limiting example, in accordance with some embodiments of the invention, the band ratio image may be formed from processing pan-chromatic and thermal infrared bands according to a determined ratio of eight for the pan-chromatic band to six for the thermal infrared band. The technique 490 thus, includes based on the band ratio, generating (block 494) the band ratio image, which highlights any wadis. A pattern recognition algorithm is then applied (block 496) to process the band ratio image to extract any straight wadi paths, as a straight wadis path delineates the outcrop of an active fault. As a non-limiting example, a pattern recognition algorithm, such as the "Ant Tracking" algorithm that is available from Schlumberger may be used, in accordance with some embodiments of the invention, for purposes of processing the band ratio image to identify active faults.

Figure 21:
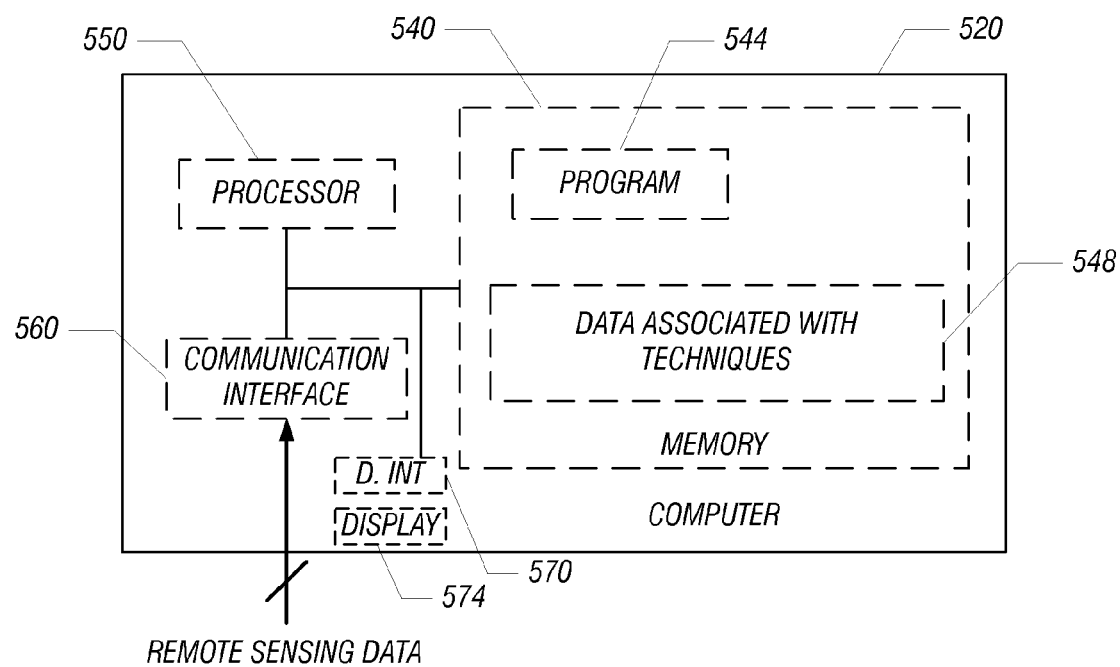
FIG. 21 is a schematic diagram of a data processing system according to an embodiment of the invention.

Referring to FIG. 21, in accordance with some embodiments of the invention, a data processing system 520 includes a processor 550 for purposes of executing at least one program 544 (stored at a memory 540) for purposes of performing one or more of the techniques that are disclosed herein in accordance with embodiments of the invention. The processor 550 may be coupled to a communication interface 560 for purposes of receiving data indicative of remote sensing data. In addition to storing instructions for the program 554, the memory 540 may store preliminary, intermediate and final datasets involved in the techniques that are disclosed herein. Among its other features, the data processing system 520 may include a display interface 570 and display 574 for purposes of displaying the various maps and models that are generated as described herein.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving first data belonging to a first type of remote sensing data for a region of interest;
   receiving second data belonging to a different second type of remote sensing data for the region of interest; and
   processing the first and second data in a processor-based machine to determine a risk map for the region of interest based at least in part on the first and second data, wherein the risk map represents a risk of scattering for a geologic survey conducted in the region of interest.

2. The method of claim 1, wherein:
   the first data comprises data representing one of the members of a set consisting essentially of an elevation model of the region of interest, satellite-acquired spectroscopic imagery of the region of interest and satellite-acquired radar imagery of the region of interest, and
   the second data comprises data representing another one of the members of the set.

3. The method of claim 1, wherein:
the first data comprises data representing an elevation model of the region of interest, and
the second data comprises data representing a satellite-acquired spectroscopic image of the region of interest.

4. The method of claim 1, wherein the risk map further represents logistical risks for the survey.

5. The method of claim 1, wherein processing the first and second data to determine the risk map comprises:
determining topography features of the region of interest based on the first data; and
determining lithology features of the region of interest based on the second data.

6. The method of claim 5, wherein the act of determining the topography features comprises:
determining a histogram of the elevations of the region of interest;
determining a hypsographic curve based on the histogram; and
determining a classification map of the topography of the region of interest based on the hypsographic curve.

7. The method of claim 5, wherein the act of determining the topography features comprises:
determining locations of escarpments based on a multi-azimuth edge detection algorithm.

8. The method of claim 5, wherein the act of determining the lithology features comprises:
analyzing color bands of the satellite-acquired spectroscopic imagery.

9. The method of claim 8, wherein the act of analyzing the color bands comprises:
for each mineral of a predetermined group of minerals, determining a band ratio mask and applying the band ratio mask to generate a map of the mineral in the region of interest.

10. The method of claim 5, wherein
the act of determining the topography features comprises determining an escarpment map,
the act of determining the lithology features comprises determining a hard rock mask and determining a clay mask, and
processing the first and second data to determine the risk map comprises generating a lithology risk map based on the escarpment map, the hard rock mask and the clay mask.

11. The method of claim 5, wherein
the act of determining the topography features comprises determining an escarpment map,
the act of determining the lithology features comprises determining a lithology boundary map, and
processing the first and second data to determine the risk map comprises generating a data quality scatter risk map based on the escarpment map and the lithology boundary.

12. The method of claim 5, wherein
the act of determining the topography features comprises determining an escarpment map,
the act of determining the lithology features comprises determining a hard rock map, a clay mask map and a soft rock mask map, and
processing the first and second data to determine the risk map comprises generating a data quality scatter risk map based on the escarpment map, the hard rock map, the clay mask map and the soft rock mask map.

13. The method of claim 1, wherein
the scattering comprises lithologic scattering or topographic scattering.

14. The method of claim 1, wherein
the risk map further represents a risk of vibrator point loading in connection with the survey.

15. The method of claim 1, wherein
the risk map further indicates a risk for vehicle access in the region of interest.

16. The method of claim 1, further comprising
determining static corrections based at least in part on the first and second data.

17. The method of claim 16, wherein the act of determining the static corrections comprises determining a geologic near surface model for the region of interest based at least in part on the first and second data.

18. The method of claim 17, wherein the act of determining the static corrections further comprises determining an elastic near surface model for the region of interest based at least in part on the geologic near surface model.

19. The method of claim 18, wherein the act of determining the static corrections further comprises calibrating the elastic near surface model based on refraction static estimates based on near surface seismic data acquired in a seismic survey.

20. The method of claim 1, wherein
the first data comprises data representing an elevation model of the region of interest,
the second data comprises data representing a satellite-acquired spectroscopic image of the region of interest, and
processing the first and second data comprises determining a pre-erosion map of the region of interest.

21. The method of claim 20 wherein the act of determining the pre-erosion map comprises:
applying a spatial gradient filter to extract terrain edges and escarpments from the elevation model to produce a filtered image; and
generating the pre-erosion map based on the filtered image and the multispectral imagery.

22. The method of claim 21, further comprising:
identifying a graben fault in the pre-erosion map; and
based on the pre-erosion map determining a throw of the graben fault.

23. A system comprising:
an interface to receive first data belonging to a first type of remote sensing data for a region of interest and receive second data belonging to a different second type of remote sensing data for the region of interest; and
a processor to determine a risk map for the region of interest based at least in part on the first and second data, the risk map representing a risk of scattering for a geologic survey conducted in the region of interest.

24. The system of claim 23, wherein
the first data comprises data representing one of the members of a set consisting essentially of an elevation model of the region of interest, satellite-acquired spectroscopic imagery of the region of interest and satellite-acquired radar imagery of the region of interest, and
the second data comprises data indicative of another one of the members of the set.

25. The system of claim 23, wherein
the first data comprises data representing an elevation model of the region of interest, and
the second data comprises data indicative of a satellite-acquired spectroscopic image of the region of interest.

26. The system of claim 23, wherein the risk map further represents logistical risks for the survey.

27. The system of claim 23, wherein the processor is adapted to:
- determine topography features of the region of interest based on the first data;
- determine lithology features of the region of interest based on the second data; and
- combine the determined topography and lithology features to generate the risk map.

28. The system of claim 23, wherein the processor is adapted to:
- determine a histogram of the elevations of the region of interest;
- determine a hypsographic curve based on the histogram; and
- determine a classification map of the topography of the region of interest based on the hypsographic curve.

29. The system of claim 23, wherein the processor is adapted to:
- determine locations of escarpments based on a multi-azimuth edge detection algorithm.

30. The system of claim 23, wherein at least one of the first and second data represents
- color bands of the satellite-acquired spectroscopic imagery, and the processor is adapted to analyze color bands of the satellite-acquired spectroscopic imagery.

31. The system of claim 30, wherein the processor is adapted to use the analysis of the color bands to, for each mineral of a predetermined group of minerals, determine a band ratio mask and apply the band ratio mask to generate a map of the mineral in the region of interest.

32. The system of claim 23, wherein the processor is adapted to:
- determine an escarpment map;
- determine a hard rock mask;
- determine a clay mask; and
- generate a lithology risk map based on the escarpment map, the hard rock mask and the clay mask.

33. The system of claim 23, wherein the processor is adapted to:
- determine an escarpment map;
- determine a lithology boundary map; and
- generate a data quality scatter risk map based on the escarpment map and the lithology boundary map.

34. The system of claim 23, wherein the processor is adapted to:
- determine an escarpment map,
- determine a hard rock map;
- determine a clay mask map;
- determine a soft rock mask map, and
- generate a data quality velocity risk map based on the escarpment map, the hard rock map, the clay mask map and the soft rock mask map.

35. The system of claim 23, wherein:
- the risk map represents of a risk of lithologic scattering or-topographic scattering.

36. The system of claim 23, wherein:
- the risk map further represents a risk of vibrator point loading in connection with the survey.

37. The system of claim 23, wherein:
- the risk map further represents a risk of noise from trapped surface modes in connection with a seismic survey conducted in the region of interest.

38. The system of claim 23, wherein:
- the risk map further represents a risk for vehicle access in the region of interest.

39. The system of claim 23, wherein:
- the first data comprises data representing an elevation model of the region of interest,
- the second data comprises data representing satellite-acquired multispectral imagery of the region of interest, and
- the processor is adapted to determine static corrections based at least in part on the first and second data.

40. The system of claim 23, wherein the processor is adapted to determine a geologic near surface model for the region of interest based at least in part on the first and second data.

41. The system of claim 40, wherein the processor is adapted to determine an elastic near surface model for the region of interest based at least in part on the geologic near surface model.

42. The system of claim 41, wherein the processor is adapted to calibrate the elastic near surface model based on refraction static estimates based on near surface seismic data acquired in a seismic survey.

43. The system of claim 23, wherein:
- the first data comprises data representing an elevation model of the region of interest,
- the second data comprises data representing a satellite-acquired spectroscopic image of the region of interest, and
- the processor is adapted to determine a pre-erosion map of the region of interest.

44. The system of claim 43, wherein the processor is adapted to:
- apply a spatial gradient filter to extract terrain edges and escarpments from the elevation model to produce a filtered image; and
- combine the filtered image with the satellite-acquired multispectral imagery to generate the pre-erosion map.

45. The system of claim 44, wherein the processor is adapted to identify a graben fault in the pre-erosion map and based on the pre-erosion map, determine a throw of the graben fault.

46. A method comprising:
- receiving first data representing different bands of satellite acquired multispectral imagery;
- processing the first data in a processor-based machine to generate second data representing a band ratio image;
- identifying wadis based at the band ratio image; and
- applying a pattern tracking algorithm to identify at least one path formed by the wadis to identify an active fault.

47. The method of claim 46, wherein the act of processing the first data comprises:
- processing data indicative of pan-chromatic and thermal infrared bands such that the band ratio image is formed from a ratio of the pan-chromatic and thermal infrared bands.

* * * * *